Dec. 20, 1966  R. O. YAVNE  3,292,439
GYROSCOPE

Filed July 21, 1964  5 Sheets-Sheet 1

INVENTOR.
RAPHAEL O. YAVNE
BY Paul Maleson
ATTORNEY

INVENTOR.
RAPHAEL O. YAVNE
BY Paul Maleson
ATTORNEY

Dec. 20, 1966  R. O. YAVNE  3,292,439
GYROSCOPE

Filed July 21, 1964  5 Sheets-Sheet 5

INVENTOR.
RAPHAEL O. YAVNE
BY Paul Maleson
ATTORNEY

United States Patent Office

3,292,439
Patented Dec. 20, 1966

3,292,439
GYROSCOPE
Raphael O. Yavne, 1001 Haral Place,
Cherry Hill, N.J. 08034
Filed July 21, 1964, Ser. No. 386,812
7 Claims. (Cl. 74—5.6)

This invention relates to gyroscopes and more particularly to the apparatus and methods for improving the accuracy of gyroscopes. It relates to apparatus and methods whereby errors and drifts in gyroscopes are reduced.

It is well known that all gyroscopes, no matter how delicately balanced, whether suspended mechanically or by a floatation system, are subject to errors in maintaining the alignment of the gyroscope axis with respect to a line fixed in space to a degree which impairs their usefulness for many purposes. Whenever the alignment of a gyro axis is referred to in this specification, it is understood to mean in respect to a line fixed in space or to a fixed coordinate system.

Many means for increasing the accuracy of gyroscopes have been proposed and practiced. The most common approach to increasing gyroscope accuracy has been to improve the suspension mechanism of the gyroscope. The utilization of such an approach has resulted in gyroscopes of relatively high cost and in some cases relatively large physical size.

Another proposed measure has been to provide a multiplicity of gyroscopes with means for averaging the errors. One such proposal utilizes a pair of counter-rotating gyroscopes.

There are several causes for the drift of gyroscopes. The words drift, bias or error are used interchangeably to refer to a departure from true alignment. An important cause is imbalance in some part of the gyroscope system, such as the gyroscope motor or gyroscope suspension apparatus. Another cause of error is exteriorly applied torques, resulting, for example, from friction. A continuously acting source of error, such as an imbalance in a gyro gimbal, will produce a steady bias or drift in the gyroscope. This steady bias will, of course, be cumulative in its effects. Furthermore, a steady bias may suddenly change its magnitude or direction because of some mechanical or other change in the cause of the bias.

Intermittent or varying exterior torques or imbalances, largely due to temperature variations, cause random drifts or errors in the gyro axis alignment.

Instead of attempting to minimize the gyroscope drifts by increased mechanical or other refinements of the suspension system or other parts of the gyroscope, and instead of attempting to compensate for gyroscope drifts by various multiple-gyroscope averaging means, this invention comprises a gyroscope that inherently possesses a stability and freedom from drift of a far greater degree than any heretofore known gyroscope. This inherently more accurate gyroscope achieves its accuracy without regard to, and in addition to, the improvement in accuracy and stability supplied by any presently known means. Thus, the refinements of gyroscope supporting structure or other refinements which increase the accuracy of gyroscopes may be utilized with my gyroscope with the usual attendant increase in stability. However, for any given degree of refinement of the gyroscope system, the use of my gyroscope in the system will result in a substantially higher over-all stability and accuracy.

The value of this invention lies mainly, of course, in instruments utilizing gyroscopes, such as gyrocompasses, certain accelerometers and stabilized platforms and especially where a fixed reference in space is required. While the usefulness of my gyroscope in navigation instruments is readily apparent, it is understood that a statement of suggested uses in no way limits the scope of the invention. It will be apparent, for example, that for many uses, the gyroscope constructed according to my invention may be built with less care in its balancing than is used with presently known gyros, and that in many applications the floatation method of suspension, which is inconvenient, may be eliminated with no loss in accuracy to the instrument. In addition to the value of obtaining a particular desired standard of accuracy with a less expensive gyroscope system than is heretofore used, it is also true that where the maximum obtainable accuracy is required without primary regard to cost, my gyroscope will permit greater over-all gyroscope accuracy than has been heretofore obtainable regardless of the refinement of the system.

The pick-off devices used with gyroscopes to indicate the gyro attitude to an electronic system exert some force on the gyroscope and contribute to its drift. Since my invention corrects the drifts caused by such forces, it will be seen that the problem of providing a pick-off is simplified. Less expensive pick-offs may suffice since their reactions on the gyroscope are automatically corrected.

It is a primary object of this invention to provide a gyroscope that will be inherently more stable and accurate than gyroscopes presently known.

It is an object of this invention to provide a gyroscope that incorporates means for self-servoing so as to greatly increase its stability and accuracy.

It is another object of this invention to provide a gyroscope wheel containing within itself an inner, non-solid, highly accurate gyroscope driven by and controlling the gyroscope wheel.

It is yet another object of this invention to provide a gyroscope wheel containing within itself a cavity at least partly filled with a fluid acting as an inner gyroscope, driven by the gyroscope wheel and supplying signals whereby the outer gyroscope wheel may be torqued to eliminate errors and drifts in its alignment.

It is still another object of this invention to provide a gyroscope system comprising a gyroscope wheel, means to rotate said wheel, an inner, non-solid gyroscope contained in a cavity whithin said wheel and driven by viscosity coupling by said wheel, means to determine the rotational axis of said inner gyroscope, and means to supply error signals from said inner gyroscope to a self-servoing mechanism to torque said wheel to align itself with the inner gyro axis and thereby to correct errors in the alignment of same.

It is another object of this invention to provide methods of stabilizing gyroscopes and setting up self-servoing gyroscopes.

It is an object of this invention to provide pick-off systems. Other objects of this invention will be apparent.

Yet another object of this invention is to provide a gaseous or liquid gyroscope driven by viscosity coupling and a pick-off system whereby the axis of rotation of said fluid gyroscope may be accurately and continuously determined.

It is a still further object of this invention to provide a capacitance pick-off system, resistance system or photo-electric-optical pick-off system whereby the slightest change in the alignment of a gyro-wheel axis relative to the axis of rotation of a mass of liquid or gas may be converted into useful signals.

The basic structure of this invention may be embodied in many ways or combined with a variety of equipment. Certain of these embodiments are described below, but they will depend on the essential aspect of the invention which is initially described.

At the center of the rotation of a gyro-wheel, a spherical cavity is provided. This sphere contains a fluid, gas or liquid. If a liquid, the cavity is only partially filled.

If a gas is used, it is under pressure; this pressure may be very high. The gyroscope wheel is rotated up to its operational speed by conventional driving means. The method of driving the gyroscope wheel, as for an example by electric motor or air, is not critical in relation to this invention. The walls of the spherical cavity are now rotating relative to the contained fluid. As is known from established principles of fluid mechanics, the particles of fluid near the cavity walls rotate with the walls. By one of the assumptions of fluid mechanics, that layer of fluid immediately adjacent the walls, will "adhere" to them with no slippage whatsoever. The operation of my gyroscope does not depend on the adherence and in fact if there is no adherence the operation would be enhanced. Each succeeding layer of fluid, moving inwardly away from the walls, transmits to its inner adjacent layer a shearing force which in turn will induce a corresponding rotational movement in the succeeding inward layers. This phenomenon is due to the viscosity of the fluid, and hereinafter is termed viscosity coupling.

As the cavity walls continue to rotate, the fluid's corresponding rate of rotational motion progressively approaches that of the walls; the outer layers of fluid pick up speed first and the fluid near the center of the sphere picks up speed later. Thus, the fluid contained inside the gyro-wheel tends to follow the rotation of the wheel by viscosity coupling after a time lag. It is understood that the term "layers" used in connection with the fluid is convenient in graphically describing the operation and theory of the viscosity coupling process, but does not necessarily imply the existence of discrete physical layers.

When proper low viscosity fluids are used, so that the time lag or warm-up period is substantial, the fluid takes on the characteristics of a gyroscope in itself. After the outer gyro-wheel has run for the warm-up period, the fluid contained within it is acting as a gyro itself with its rotational axis aligned with that of the gyroscope wheel's axis. If the gyro-wheel's axis of rotation is now angularly displaced with relation to its initial position, only the boundary layer of fluid, i.e. the mathematical layer immediately adjacent the cavity walls, will follow the new alignment of the gyro-wheel at once. The remainder of the fluid continues to rotate in its original axial alignment. The time required for any given particle of the fluid to fully conform its rotational axis to the new rotational axis of the gyro-wheel, within a small error, is as long as the time required to initially get the particle up to its rotational speed within the same error relative to the gyro-wheel speed, (assuming the fluid initially at rest and the gyro-wheel initially turning at full operative speed).

The numerous sources of error which act on the gyro-wheel, such as friction and imbalance, as have been described above, do not act on the inner or fluid gyro. The only external force acting to alter the axial alignment of the inner or fluid gyro is that exerted by shearing stresses induced by the cavity walls which are transmitted to and throughout the fluid by viscosity coupling. Thus, the inner gyro is supported in an extraordinarily simple suspension, free from the sources of error that affect the gyro-wheel.

It is seen then that when an error is introduced into the alignment of the gyro-wheel, the axial alignment of the inner gyro will not reflect that error by following it until the time constant is elapsed. The inner gyro axis will remain in its original alignment until the viscosity coupling causes it to alter and follow the new gyro-wheel alignment.

Means are provided to identify the axis alignment of the inner gyro and to detect any change in the relative alignment of the gyro-wheel axis with respect to the inner or fluid gyro axis. Such a change is due to an error in the gyro-wheel axis. A signal, corresponding to the magnitude and direction of the angular axial displacement, is produced and used in a servo follow-up system to torque the gyro-wheel so that its axis will follow the inner gyro axis. That is when the axial alignments of the gyro-wheel and the inner gyro differ, the servo follow-up system will torque the gyro-wheel so that the alignment of its rotational axis will be the same as that of the inner gyro.

Means whereby a rotating gyroscope may be torqued in any desired direction are well known in the art. It is no part of the present invention to provide any innovation in torquing means per se. It is likewise true that electronic or other means whereby an electrical signal may serve to control a torquing means are well known in the art.

Throughout this specification, the terms inner gyro or fluid gyro are interchangeable and refer to the body of fluid rotating so as to have gyroscopic qualities. The term gyro-wheel refers to the solid, conventional gyroscope wheel which, in accord with this invention, contains the inner or fluid gyro.

While the preferred form of the cavity containing the fluid is spherical, it will be appreciated that a cavity of other than spherical shape will also theoretically be operative. A square cavity, to take one case, would still impart the required gyroscopic effect to the fluid. This would not be a practicable form for the cavity because the fluid in the corners would not effectively participate in the fluid mass' gyroscopic action and because of possible turbulence and eddy effects. Thus, while maximum sphericity of the cavity is preferred, deviations from a perfect spherical shape will not render my improved gyroscope inoperative.

As the gyro-wheel rotates during the warm-up period, the various spurious forces mentioned above are acting on it, and it precesses. Therefore, during the warm-up period, the gyro-wheel should be kept aligned by exterior means. For example, it can be sighted on a star or other point in space until the inner gyro is up to operative speed and can be locked into the servo system to take over the function of holding the gyro-wheel alignment. Another method which can be used during the warm-up period is to let the gyro-wheel drift and to lock the inner gyro (after it has attained operative speed) into the servo system when the gyro-wheel axis passes the chosen alignment. If the inner gyro is not perfectly aligned with the desired direction in space when the lock-on occurs, the difference in alignment, which remains constant thereafter, may be externally compensated for by a computer.

Figures 1, 2, 3:
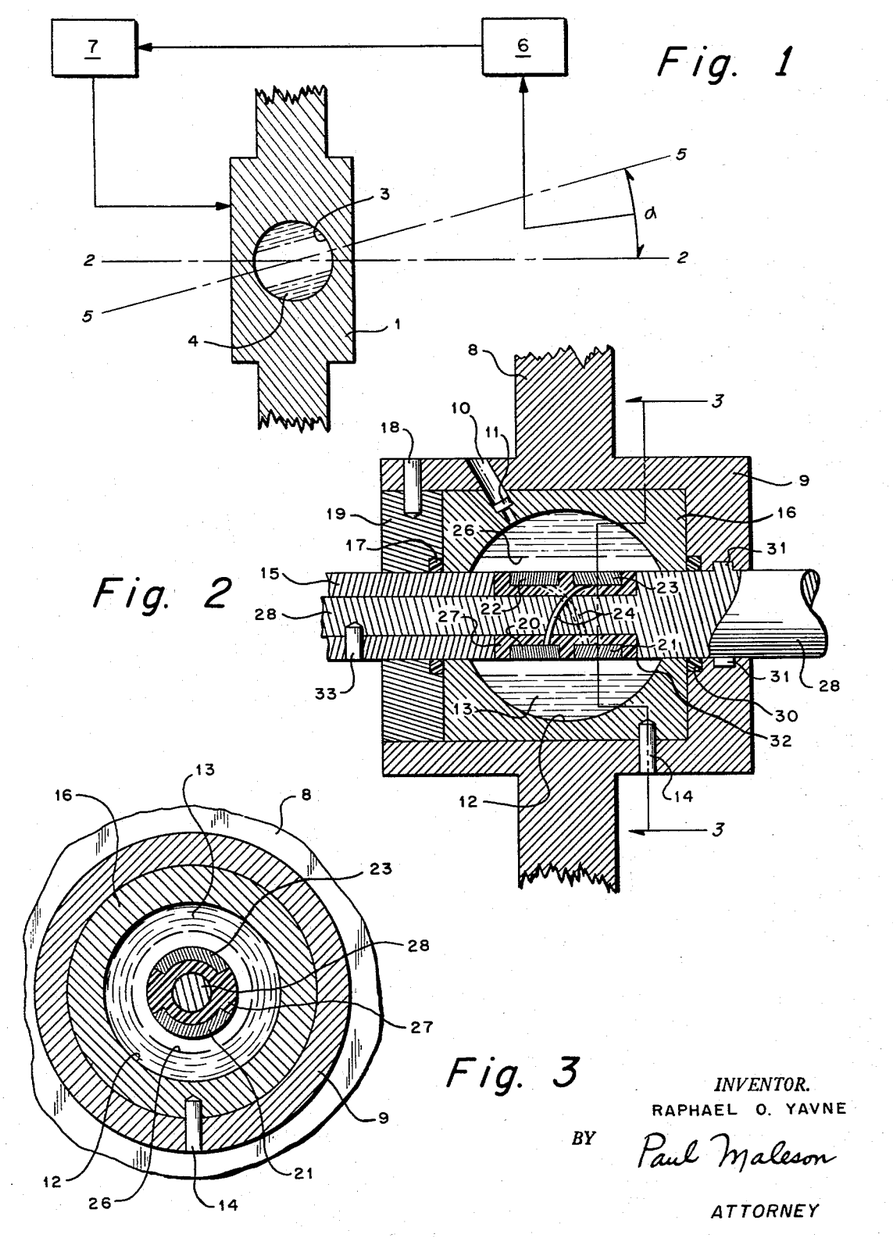
FIGURE 1 illustrates the operative principle of this invention in diagrammatic form.
FIGURE 2 is a cross-sectional view taken through a gyro-wheel along its rotational axis showing a capacitance pick-off system.
FIGURE 3 is a cross-sectional view taken on line 3—3 of FIGURE 2.

FIGURE 1 shows in diagrammatic form the operative principle of the present stable gyroscope. The ordinary solid gyroscope or gyro-wheel 1 is shown in cross-section taken on the diameter of the gyroscope wheel and coincident with its rotational axis. Line 2—2 indicates the rotational axis of the gyroscope wheel. At the center of the wheel, a spherical cavity 3, filled with fluid, is positioned. The figure represents a condition in which the gyro-wheel has run at its normal speed for a period sufficient to induce an operational rotational speed and corresponding gyroscopic action in the fluid contained in cavity 3, henceforth referred to as the fluid gyro 4.

FIGURE 1 shows the gyro-wheel 1 suffering misalignment with the fluid gyro axis due to precession because of a spurious, unwanted, external force. The line 5—5 indicates the rotational axis of fluid gyro 4, and also the initial axis of the gyro-wheel. When the gyro-wheel 1 precessed, the only force exerted on the fluid gyro was the viscosity coupling effect which acts initially only at the cavity wall. Thus, though the fluid immediately adjacent the cavity wall may shift its rotational axis with that of the gyro-wheel, the general axis 5—5 of the fluid gyro will remain in its initial alignment. The displacement $\alpha$ of the gyro-wheel axis from the fluid gyro axis is shown exaggerated in FIGURE 1.

The displacement angle $\alpha$ is sensed by a sensing device 6 which in turn operates a torquing system 7 which restores the alignment of the axis of gyro-wheel 1 to correspond with the alignment of the axis of fluid gyro 4. In other words, the servo mechanism 6 and 7 tends to continue to keep angle $\alpha = 0$.

FIGURE 1 illustrates, of course, only a displacement in one direction, parallel to the surface of the paper. The displacement also, in the general case, has a component of angular displacement at right angles to the paper surface. The sensing device 6 therefore also must detect the direction of the displacement as well as its magnitude and the torquing system 7 must restore the axial alignment of the gyro-wheel 1 accordingly.

It is apparent that any fluid whatsoever contained within the cavity will react to the rotation of the gyro-wheel by rotating itself and producing a gyroscopic effect. As a practical matter, certain qualities of the fluid are highly desirable to provide commercial utility for the gyroscope.

A fluid with a high kinematic viscosity would alter its axis alignment to conform to a new axis alignment of the gyro-wheel in a very short period of time, i.e. the time lag would be too short. When the time lag is short, and the fluid gyro axis rapidly follows that of the gyro-wheel, the value of the inner-gyro for maintaining a true axis alignment when a bias affects the gyro-wheel alignment is largely lost.

Where fluids of relatively low kinematic viscosity are used, the "warm-up period," that is, the time required for the inner-gyro to come up to operative speed when the gyro-wheel and inner-gyro were initially at rest, will be relatively lengthy.

It is, of course, not necessary that the rotational speed of the fluid equal that of the gyro-wheel. As the gyro-wheel rotates during the warm-up period, the error between the rotational speed of the fluid and the rotational speed of the gyro-wheel decreases so that the speed of the fluid approaches that of the wheel without theoretically attaining it. Thus, "operative speed" of the inner gyro is less than the gyro-wheel speed. It may, for example, be about ⅔ of the gyro-wheel speed though this figure is given as an example only and does not limit the range of the operative speeds.

The slight disadvantage in requiring a long warm-up period in order to be operative (a period which may be as much as an hour or more, for an example,) is offset by the corresponding tendency of the fluid gyro, once it is rotating at an operative speed, to retain its correct axis alignment regardless of error in the gyro-wheel axis alignment. A relatively high kinematic viscosity fluid would have a relatively short warm-up period, but as explained above, its short time lag would reduce its stability and hence the accuracy of the gyroscope system.

The fluid used must also be stable itself and inert in contact with the material of the cavity wall within the operating temperature limits. Various fluids that meet these requirements are mentioned hereinafter, but the enumeration of particular fluids in this specification should not be construed to limit the scope of the patent to such fluids. Other fluids with known characteristics will suggest themselves as being more or less suitable for this application to persons skilled in the art. In addition to possessing above enumerated characteristics, the fluid must have some quality which will enable its rotational axis to be identified and a change in its axis alignment relative to the gyro-wheel axis to be detected. Such qualities and means for detection are described hereinafter.

As has been stated, one class of acceptable fluids is liquid. The liquid should have a relatively low kinematic viscosity. One liquid which has been found fit for this application is mercury. If the cavity wall be constructed of steel, for instance, the mercury will be non-wetting and non-corrosive.

Other liquids which are suitable include, in addition to mercury, alcohols and silicone damping fluids. The fluid used may also be a gas under pressure. Among the suitable gasses are nitrogen, argon, neon, krypton and xenon. Other suitable gasses include silicon tetrafluoride, tungsten fluoride, stibine ($S_bH_3$), $UF_6$, $F_2CF_2$, $CClF_3$, $CCl_2F_2$, $CHCl_2F$, $Si_2F_6$, $SF_6$, $PF_5$, $HI$, $GeF_3Cl$, $GeCl_2F_2$, $CClF_2ClF_2$, and $CCl_2FCF_3$. Other suitable fluids include isopentane, n-pentane, pentane-1, n-hexane, hexane-1, isoprene, n-heptane, and heptane-1. It is understood that these fluids are listed as examples only and are not to be construed as exhaustive of the possible fluids usable in this invention. Obviously, fluids of different known properties will suggest the appropriate corresponding modifications in the practice of the invention. Gasses should have a low dynamic viscosity. The viscosity of gasses remains substantially constant as pressure is increased, but since the density of the gas increases with pressure, the dynamic viscosity decreases.

The following embodiments will be described with reference to mercury as the fluid. The cavity is partially filled with liquid, hereinafter referred to as mercury. The proportion of the volume of the cavity filled with the mercury is not critical and may vary within limits. When the gyro-wheel has run for the warm-up period, the mercury will have been driven radically away from the axis of rotation by centrifugal force, will be rotating, and will produce a "vacuum cylinder" aligned with and centered around the general axis of rotation of the mercury mass. This cylinder will, of course, be filled with mercury vapor due to the vapor pressure of the mercury. It may also be filled with a gas, such as helium for example, under some pressure to help avoid seepage of the mercury by balancing internal and external pressures. Thus, the term "vacuum cylinder" is convenient but not necessarily always accurate.

If the axis alignment of the gyro-wheel is altered, a viscosity coupling force tending to change the axis of the mercury gyro will be applied, but initially only that part of the mercury immediately adjacent to the cavity walls will be affected. In FIGURE 2, the spherical cavity 12 contains mercury 13, partially filling the cavity. FIGURE 2 represents the cavity rotating at operational speed and after the warm-up period. The surface of the vacuum cylinder is shown at 26. Further explanation of FIGURE 2 is made below.

The mercury surface of the cylinder is parallel to the axis of rotation of the mercury mass. It will not be unduly disturbed by ripples because of the high acceleration to which it is subjected. For example, if the cavity is 2″ in diameter, the vacuum cylinder is 1″ in diameter, and the gyro-wheel rotates at 12,000 r.p.m., a force of approximately 2,000 g. acts perpendicularly to the cylinder surface and suppresses any ripples to an extent that the operation of the system is not impaired.

If means be provided to detect any change in the alignment of the gyro-wheel with respect to the alignment of the vacuum cylinder surface, a servo-mechanism may then operate to return the gyro-wheel axis so that it corresponds with the vacuum cylinder surface alignment. Embodiments of several means for detecting any relative change in the axes of the gyro-wheel and fluid gyro are described below. It is understood that the enumeration and description of particular means for this function does not limit the scope of this patent to that particular means.

FIGURES 2 and 3 illustrate an embodiment of a capacitance system for identifying and detecting a change in the vacuum cylinder or mercury surface axis alignment relative to that of the gyro-wheel axis. FIGURE 3 is a cross-sectional view taken on line 3—3 of FIGURE 2. A gyro-wheel 8 is rotated by a motor or other means (not shown) through a compound shaft 28, 15. At the center of the gyro-wheel is a hub 9. At the end of the shaft opposite the motor means, a counterweight (not shown) may be provided. The hub 9 contains a cylindrical block 16. This block has a spherical cavity 12, a filling aperture 10, and aligned holes at either end whereby the shaft may be inserted through the block with a snug fit. A smooth-walled cavity of a sufficiently perfect sphericity may be made by casting using the lost-wax process, or by any other convenient method. The block is retained within the hub 9 by means of a retainer 19. This retainer is held in place by dowel 18. The block 16 is secured within hub 9 by dowel 14. The retainer 19 has a seal, generally indicated at 17, to prevent leakage along the shaft. Another seal 30 is positioned at the other end of the block to prevent leakage along the shaft in that direction.

The shaft and its associated structure will be described in detail first. The shaft is keyed or splined to the gyro-wheel by any convenient means, such as keys 31, so as to drive the wheel. The longitudinal shaft axis is coincident with the axis of rotation of the gyro-wheel. The shaft element 28 is reduced at shoulder 32, so that a ring or collar 27 of insulating material, such as porcelain, Bakelite or glass, for example, may be assembled on the reduced portion.

Embedded in the appropriate cavities on the surface of the collar 27 are two pairs of capacitance plates, consisting of pair 21 and 22 and of pair 20 and 23 arranged as shown in the drawings. Pair 20, 23 are connected by a conductor 24 which is insulated from the other pair of plates and from the shaft. This conductor follows the circumference of the shaft. A similar conductor (shown in phantom) connects the pair of plates 21, 22. After the capacitance plate and insulation assembly is positioned on the shaft, a tubular shaft element 15 is positioned against the insulating collar and held in place by dowel 33. Thus, the assembled shaft presents a substantially uniform diameter along its length, one portion of the shaft surface consisting of the two pairs of capacitance plates isolated and embedded within the ring of insulation.

The cavity 12 is then filled with mercury 13 through filling aperture 10. When sufficient mercury has been supplied, a cap 11 with an inner surface so shaped as to conform to the inner surface of the cavity is inserted in the filling aperture to seal the mercury within the cavity.

If the shaft and consequently the gyro-wheel now be rotated, and after the warm-up period has elapsed, the mercury will assume the position shown in FIGURES 2 and 3. The surface of the cylinder formed by the mercury is indicated at 26. Simple mathematical calculations will indicate how much mercury need be inserted into the cylinder so that when the gyro is in the operative position shown in FIGURE 2, the surface 26 will be spaced closely from the surface of the compound shaft. The spacing of the plates from the mercury may be measured by measuring the capacitance between them. The accuracy of this measurement may be within 0.0001″, for example.

This spacing between the mercury surface and the capacitance plates should be as close as possible to provide the greatest possible accuracy. A spacing of .01 inch is given as an example of a satisfactory gap.

If the gyro-wheel is biased from its initial alignment, the shaft will, of course, change its axial alignment to the same extent. Consequently, at a given instant one pair of connected capacitance plates will approach the surface 26 and the other pair will recede from the surface. As is well known, capacitance is a function of distance between the capacitor plates, inter alia, and considering the mercury surface 26 as one capacitor plate, it will be seen that when a bias occurs, the capacitance of the pair of plates that approaches the surface 26 will increase and the capacitance of the pair that recedes will decrease. The difference in the capacitance of the two pairs is an index of the amount of bias that has occurred.

The capacitance plates are electrically connected exteriorly to the gyro-wheel by any convenient means. Means for conducting electrical signals from a rotating gyro shaft are, of course, well known. For example, conductors may be lead from the plates within suitable channels (not shown) in the shaft to slip rings (not shown), one slip ring being provided for each pair of plates. U.S. Patent No. 2,709,244, for example, discloses gyro leads.

It is understood that the embodiment illustrated in FIGURES 2 and 3 has had the dimensions of certain parts expanded for ease in presentation. For example, the capacitance plates 20, 21, 22, 23 may be, and preferably are, very thin in relation to their other dimensions. The space between the vacuum cylinder wall or mercury surface 26 and the general shaft surface is likewise exaggerated. Furthermore, the various elements of the assembly may be held together by any convenient means, such as by press fits. The utilization of dowels, as shown, is not necessarily the only means of fastening. Furthermore, the capacitance plates and their insulating beds may be assembled on the shaft in a manner other than that described above.

It will be appreciated that due to the rotation of the shaft, each pair of plates will approach and recede from the surface 26 once during every revolution of the shaft, producing a variation in capacitance whose frequency is a function of the speed of rotation of the shaft. The two pairs of capacitance plates will produce similar signals 180° out of phase with each other.

Figure 4:
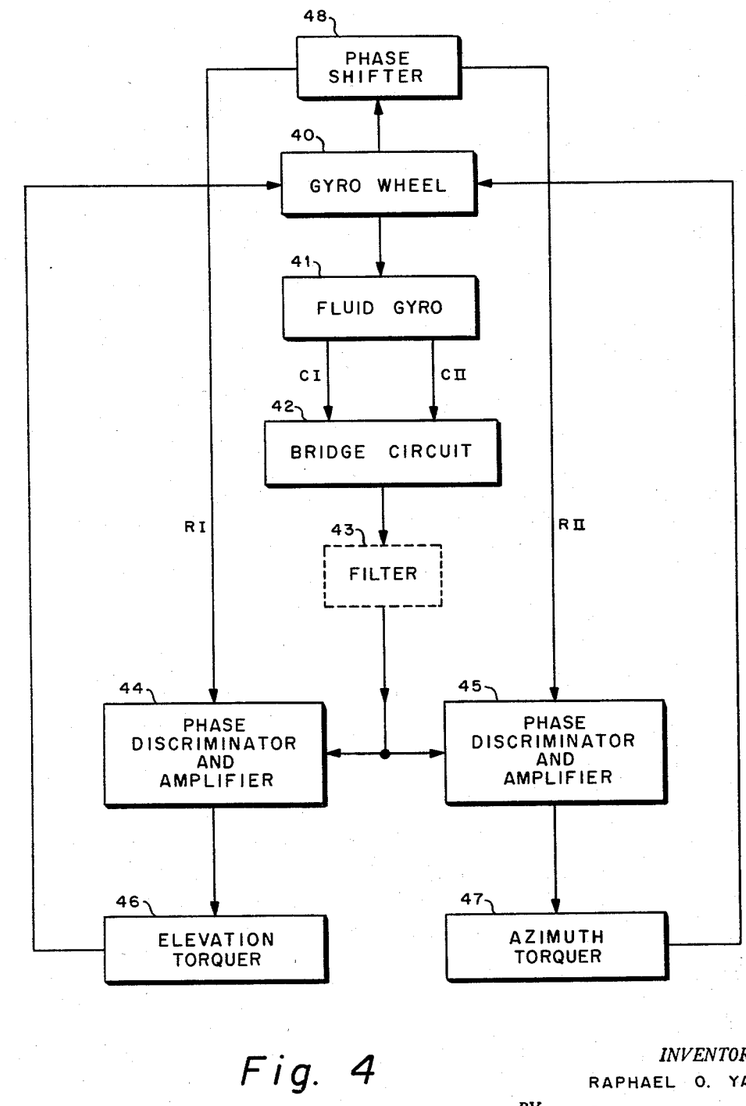
FIGURE 4 is a block diagram showing diagrammatically the inter-relationships of the components of the gyroscope system.
Figure 4A:
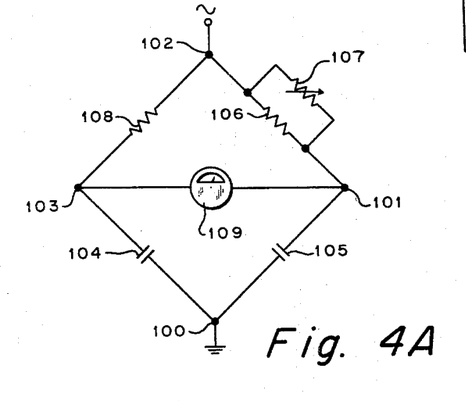

The circuitry of the capacitance pick-off can best be explained by reference to FIGURE 4A. The pair of capacitance plates 21, 22 (FIGURE 2) is indicated by capacitor 104. The pair of plates 20, 23 is indicated by capacitor 105. FIGURE 4A represents the capacitance plate pairs in the bridge circuit which includes fixed resistances 106 and 108. A high frequency A.C. voltage is applied across the bridge at 102: point 100 represents ground. This voltage may have, for example, a frequency from 2000 to 4000 cycles/second. It serves as a carrier and is necessary to provide a finite resistance across the capacitor. The high frequency carrier is later filtered out by a resonant circuit as in filter 43 (FIG-URE 4).

When the inner gyro is at operational speed and has been locked on to the gyro-wheel with no angular displacement of their respective axes as described above, the parallel variable resistor 107 is adjusted to balance the bridge so that no D.C. bias signal envelope is superimposed on the high frequency carrier. Even if no adjustment of resistor 107 be made, the system is operative since the envelope is merely uniformly displaced. Thus, if there is no angular axial displacement, only the carrier frequency is observable at point 109 between points 101 and 103. This is the frequency which is later filtered out. The signal at 109 is the signal which is shown as the bridge circuit output in FIGURE 4.

FIGURE 4 represents in diagrammatic form the operation of my improved gyroscope using a capacitance pickoff. The gyro-wheel 40 drives the inner fluid gyro 41 by viscosity coupling as has been stated. Each pair of capacitance plates produces an A.C. signal envelope on the carrier whose frequency is the angular rate of the gyro-wheel divided by 2 (as will be described) if there is a difference in the axial alignments of the gyro-wheel 40 and fluid gyro 41. These signals are identified as CI and CII respectively in FIGURE 4.

The signals CI and CII will be substantially identical and 180° out of phase and are supplied to a capacitance comparison bridge 42. If there is no cyclic variation in the spacing of the capacitance plates from the mercury surface, the bridge will be balanced and therefore no signal will be put out from the bridge. The bridge will have been previously adjusted so that it will be balanced if the capacitance plates remain uniformly distant from the mercury surface. Any cyclic variation in the spacing of the plates from the mercury surface, as occurs when the axes of the fluid gyro and gyro-wheel differ, will produce an imbalance in the bridge circuit and hence produce a signal from the bridge circuit. The amplitude of the A.C. signal output of the bridge will therefore also be an index of the angular displacement of the gyro-wheel axis from the fluid gyro axis.

This signal may then be sent through filter 43 which removes such spurious signals as any D.C. output, the high frequency carrier, and any high frequency ripple signal. The signal thereafter is split to phase discriminator and amplifier 44 and to phase discriminator and amplifier 45.

A third signal is taken off the gyro-wheel shaft. This signal is likewise an A.C. signal and is a function of the shaft rotational speed only. Its point of maximum amplitude is related to a fixed position of the shaft. For example, a capacitance plate may be mounted at any convenient point on the circumference of the shaft at a point conveniently exterior to the cavity 12. This reference signal goes to phase shifter 48 and is there split into two identical reference signals 90° out of phase with each other. One signal remains in its original phase; the other is shifted. These signals are designated in FIGURE 4 as RI and RII respectively. Signal RI goes to phase discriminator 45.

Discriminator 44 will then produce a signal whose amplitude represents the force necessary to be applied to the gyro-wheel in one direction to restore to zero the component of the difference in axial alignment between the inner gyro and the gyro-wheel occurring in that direction. Phase discriminator 45 produces a similar signal except that its amplitude represents the necessary restoring force component at right angles to the signal of phase discriminator 44. The phase discriminators 44 and 45 may also modulate the signals to D.C. for convenience in torquing. For convenience, one of the signals may be referred to as the elevation signal and the other as the azimuth signal. The signals are fed respectively to the elevation torquer 46 and the azimuth torquer 47. These torquers apply the appropriate torques in the appropriate directions as explained above to restore the axial alignment of the gyro-wheel to correspond to that of the inner gyro.

Compared to other fluids, mercury has a relatively low thermal coefficient of expansion. Furthermore, its coefficient of expansion is relatively linear. Thus, in addition to the temperature stability that may be induced by exterior means, such as heaters or refrigerators, the temperature variation problem in the capacitance pickoff is not a serious impairment.

While it is preferable to center the cavity on the gyro-wheel rotational axis, a slight mis-alignment of the center of the cavity will not hamper the accuracy of the system.

The action of an outside acceleration of the entire system, for an example caused by an increase in speed of a vehicle carrying the system will be considered. Such an acceleration will result in a slight deformation of the circular cross-section of the vacuum cylinder 26, but this will last only during the duration of the acceleration and will not in any case adversely affect the accuracy of the signals when the herein disclosed pickoff system is provided.

If temperature variation produces a change in the spacing between the shaft surface and wall 26 due to expansion or contraction of the mercury, the absolute value of the capacitance between the mercury and the plates will change, but the accuracy of the error signal produced will not be impaired. Furthermore, if physical limitations produce variations in the evenness of the surface along that portion of the shaft containing the capacitance plates, so that one plate, for example, is permanently closer to the surface 26 than the others, the accuracy of the signal will not be impaired since this defect will produce a D.C. signal on the envelope of the A.C. carrier which may be filtered out.

As has been explained above, the errors occurring in the alignment of a gyro-wheel usually consist of a relatively steady or constant drift or bias and random errors. It will be appreciated that the more corrective forces are applied to the gyro-wheel, the more the inner fluid gyro is disturbed by viscosity coupling. It is therefore preferable to provide a steady or constantly acting torque on the wheel to compensate for constant errors and to compensate for intermittent or random errors by intermittent corrective torquing forces. Thus, the disturbance of the fluid is kept very small. Furthermore, sophisticated integrating means and methods, as are known, can minimize the fluid disturbance.

Figure 5:
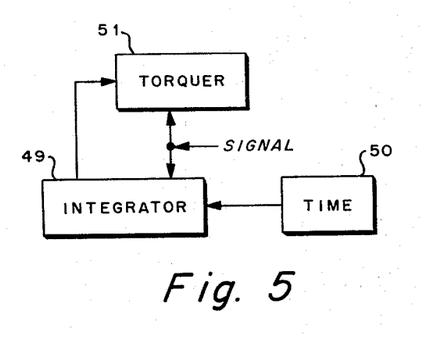
FIGURE 5 is a block diagram showing the inter-relationship of components for providing a steady correcting torque.

FIGURE 5 illustrates diagrammatically a means to accomplish this result. The correction signal is fed to the torquer and is also fed to an integrator 49. Time is fed to the integrator from a time source at 50. The signal produced by the integrator 49 is an index of the average bias of the gyro-wheel axis in the direction compensated for by the torquer 51 per chosen unit of time. This signal is fed back to the torquer 51 so that a steady torque will be applied to the gyro-wheel corresponding to the average torque applied during the prior chosen time unit. Thus, during the succeeding time unit, the only variations in the necessary torquing current will be those due to random errors in the gyro alignment. Smoothing functions and balancing functions of such an integrator system are well known. Random errors, which average to zero, will produce no steady correcting torque. It is understood of course, that both the azimuth and elevation torquers are individually given the proper steady bias by the means illustrated in FIGURE 5 and described above.

The various electronic elements described above and illustrated in FIGURE 4A and 5, such as bridge circuits and integrators, are all well known per se in the art.

Figure 6:
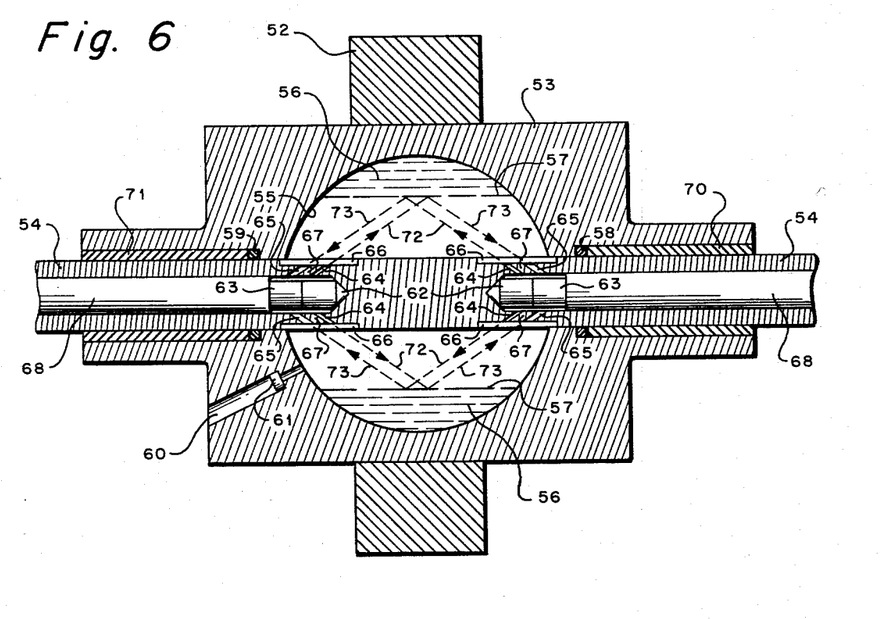
FIGURE 6 is a cross-sectional view taken through a gyro-wheel along its rotational axis of a photocell pick-off system.
Figure 7:
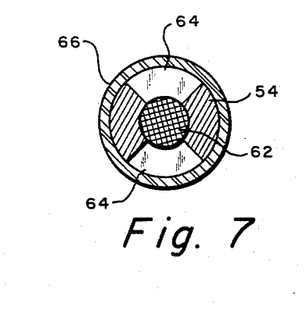
FIGURE 7 is a cross-sectional view taken along the incident light line 72 of FIGURE 6.
Figure 8:
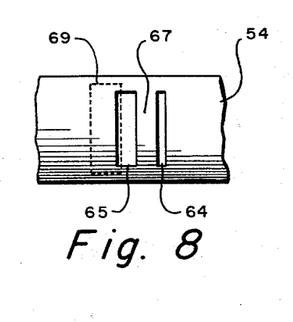
FIGURE 8 is a top view of a portion of the shaft of FIGURE 6.

Another means and methods for determining any change in the relative axial alignment of the fluid gyro and the gyro-wheel are illustrated in FIGURES 6, 7 and 8. These means and method are likewise adapted to be used with a liquid inner gyro. In this embodiment, a photoelectric principle is used. The general structure of the gyro-wheel is similar to that of the embodiment shown in FIGURE 2. A shaft 54, at least partially hollow as shown in FIGURE 6, is connected to hub 53 of gyro-wheel 52. A spherical cavity 55 is contained within the hub 53 and is centered in relation to the gyro-wheel 52. A filling aperture 60 with a cap 61 are provided as shown, and are in all respects identical to the corresponding parts of the embodiment shown in FIGURE 2. The cavity illustrated in FIGURE 6 is shown positioned directly within the hub 53 without a block, as is illustrated in embodiment shown in FIGURE 2. This block, and the various dowels and keys or splines have been omitted in FIGURE 6 to permit a clearer presentation of the essential elements of the invention. It is understood that such elements as the cavity-containing block are important for ease in manufacture, but do not in themselves bear directly on the operative principle of this invention. For example, it is far more convenient to provide a spherical cavity in a cylindrical block, and then insert the block into a gyro-wheel hub than it would be to provide a spherical cavity in the hub itself.

Around the shaft 54 and adjacent one side of the cavity is seal 58 held in place by retainer 70. Around the shaft adjacent to the other side of the cavity is seal 59 held in place by retainer 71.

The pick-off unit on the right side of the gyroscope hub pictured in FIGURE 6 will be considered in detail, since the pick-off unit on the other side is symmetrical and in all ways identical. A shaft insert 68, shaped to fit within hollow shaft 54, is inserted in said shaft. Insert 68 carries at its inner end, a light source 62 and a two unit photo-cell 63. Light from the light source 62 reaches the interior of the cavity by way of light source channel 64. As may be seen from the longitudinal cross-sectional view FIGURE 6, this light source channel is angled inwardly toward the center of the cavity and radially outwardly from the light source.

The transverse configuration of this channel 64 is best shown in FIGURE 7, a cross-sectional view taken along the path of the light beam 72. As can be seen, it comprises two diametrically opposed sections extending from the light source 62 to the exterior of the shaft 54. It will be appreciated that the total circumferential extent of the light source channel 64 should be much less than 360° so that the shaft 54 may be continuous along its length, and to discriminate between the elevation and azimuth outputs.

Each light source 62 produces two discrete beams of light in diametrically opposite directions. Each photocell 63 actually comprises two independent photosensitive elements, one for each of the two light beams produced by the light source at the other side of the cavity.

The cavity 55 is partially filled with mercury through filling aperture 60, and is then sealed within the cavity by means of cap 61 in the same manner as has been described in connection with the embodiment shown in FIGURE 2. FIGURE 6 illustrates the apparatus at a time when the gyro-wheel has rotated for the warm-up period required to bring the mercury up to operative rotational speed as has been described. If the axial alignments of the fluid gyro and gyro-wheel are coincident, the surface 57 of mercury 56 will be parallel to the surface of shaft 54. The light beam 72 strikes the cylindrical mercury surface 57 and is reflected back toward the shaft 54 so that it strikes the shaft at a point near the left side of the cavity.

The photocell 63 on the left side will be considered, through it is understood that the right hand unit is identical. The spacing between mercury surface 57 and the surface of shaft 54 is arranged so that the light beam reflection 73 enters the photocell channel 65 which leads to photocell 63. The configuration of the photocell channels is identical with the configuration of the light source channels as illustrated in FIGURE 7. A molded cylindrical glass envelope 66 is provided around shaft 54 so as to cover the channels. The shaft is recessed adjacent the channels so that the glass cover 66 has an exterior surface flush with the surface of the shaft. A beam of light from each aperture of light source channel 64 on the left enters the corresponding aperture of photocell channel 65 on the right and the identical process takes place from right to left. There are two beams of light moving from left to right to two photocell elements and also from right to left.

FIGURE 8 illustrates in plan view a light source channel 64 and photocell channel 65 on the left hand side of the shaft. The shadowed or phantom rectangle 69 represents the reflected light pattern cast on the surface of shaft 54. This light originated from the light source channel 64 at the right hand side of the shaft. The reflected light pattern 69 has larger dimensions than that of the channel 64 from which it originated since the light beam 72, 73 diverges along its length.

It will be seen from FIGURE 8 that if the light pattern falls only partially upon photocell channel 65, any movement of the pattern 69 axially to the shaft 54 will increase or decrease the amount of light falling upon the photocell 63 within the channel 65. Such a movement or displacement will occur if mercury surface 57 and the axis of shaft 54 depart from their parallel relationship. Thus, the amplitude of the signal produced by photocell 63 is an index of the degree by which the rotational axes of the gyro-wheel and the fluid gyro are angularly displaced. It will be appreciated that this signal is analogous and generally equivalent to the signal produced by the capacitance plate described in connection with FIGURE 2. The treatment of the signal as described in connection with the capacitance pick-off is applicable to the photocell signal except that the voltage outputs of the photocells are normally appropriately added and subtracted by summing amplifiers as is well known, the operation of which is analogous to the bridge. There is, of course, no A.C. carrier in this embodiment. The photocells 63 and light sources 62 are connected exteriorly to the gyroscope hub 53 by means of conductors contained within the shaft insert 68. The produced signals may then be handled in a manner such as that described in connection with FIGURE 4 with the modifications as described or in any other convenient manner so as to serve a torquing system to restore the axis of shaft 54 to a position parallel to surface 57. It is understood that the other equipment, such as the steady bias torquer described in connection with the capacitance plate pick-up is also applicable to the photo-electric pick-up.

The photocell and light source may be of any convenient configuration. A great variety of light sources and photocells are well-known in the art. The cover 66 may, of course, be made of any suitable transparent material. It is possible to eliminate this transparent cover altogether, since centrifugal force will keep the mercury clear of the channels when the gyro-wheel is rotating. Since the angles of the channels are fixed during the manufacture, the light patterns 69 may be adjusted to fall properly upon the photocell channels 65 by means of adjusting the space between surface 57 and shaft 54, which in turn depends upon the quantity of mercury contained within the cavity 55. It is obvious that the proper amount of mercury may easily be determined by simple mathematical calculation depending upon the particular dimensions used in any case. The exact dimensions of any of the elements involved herein are not critical, but, for example, the light source channel 64 may have a width of about 0.01 of an inch and the photocell channel 65 may have a width of about 0.1 of an inch. The exact intensity of the light or the amount of reflective loss in the beam are not critical. The possibility of part of the light pattern 69 falling over the adjacent light source channel 64 will not interfere with the operation.

This photo-electric embodiment is highly sensitive to any change in axial alignments. It has the particular advantage of basing its measurement on an angular difference at a point near the center of the mercury surface 57 relative to the cavity walls. The fluid most remote from the cavity walls is least likely to be disturbed in its rotation by a change in the axis of rotation of the gyro-wheel and therefore the mid-point of the surface 57 most accurately defines the initial axis of rotation of the fluid gyro.

While the operation of the photo-electric embodiment has been described in connection with mercury, the liquid employed need not be opaque. Even if the liquid is transparent, as for example, water, the light beam 72 will be partially reflected, preferably if the angle of incidence is small. Even if the fluid employed is a compressed gas rather than a liquid, it has been found that the increased density of the gas toward the cavity walls will produce a gradual bending of the light beam with a resultant equivalent to a reflection from a discrete surface. This embodiment requires very small angles of incidence. The dimensions shown in the drawings are grossly exaggerated to aid in presentation of the operative principle.

Figure 10:
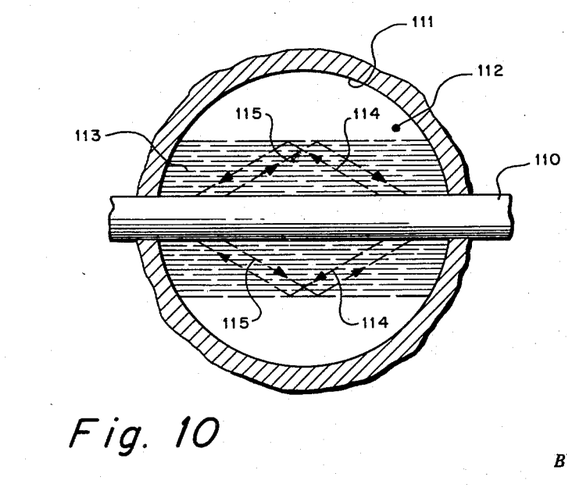
FIGURE 10 is a simplified diagrammatic view of another embodiment of the photo-cell pick-off system.

Another variation of the photo-electric pick-off principle as described above is shown in FIGURE 10. In FIGURE 10, the shaft 110 runs through the spherical cavity 111. The shaft is equipped with light sources and photocells as in the embodiment shown in FIGURE 6; the incident light beams 114 and 115 are reflected back to photocells as described above. The system is shown running at operational speed in FIGURE 10. A transparent liquid 113 forms a cylinder around the shaft 110. This liquid cylinder is surrounded by compressed gas 112. Thus, it is seen that the embodiment of FIGURE 10 is the same as that of FIGURE 6 except that the positions of the gaseous and liquid portions are interchanged. This condition is possible to attain if the density of the gas is greater than that of the liquid. In that case, centrifugal force will drive the gas outward away from the axis of rotation, leaving a cylinder of liquid around the axis.

There are a number of liquids and gasses that, when subject to reasonable pressures, provide relative densities suitable for the operation of this embodiment. For example, a silicone damping fluid, such as one of the fluids manufactured by Dow Chemical Company or alcohol and xenon (at more than 16%) under about 250 atmospheres would be satisfactory.

The liquid used in this embodiment may, of course, be a gas at atmospheric pressure. Such gasses, which are suitable because they liquify easily under pressure to relative low-density liquids, include propylene, acetylene and ethane. When such liquids are utilized, the gas utilized may be, for example, one of the number of gasses described earlier in the specification.

The gas and liquid must have enough difference in their refractive indices so that the incident light beam will be reflected back through the liquid from the interface of the gas and liquid. The angle of incidence of the light must be less than the critical angle so that total reflection will take place. The chosen materials must, of course, be stable in contact with each other. The gas must not boil or freeze within the operating temperature limits. The choice of gasses and liquids to meet these physical and chemical requirements can be made by reference to their well-known properties.

Figure 9:
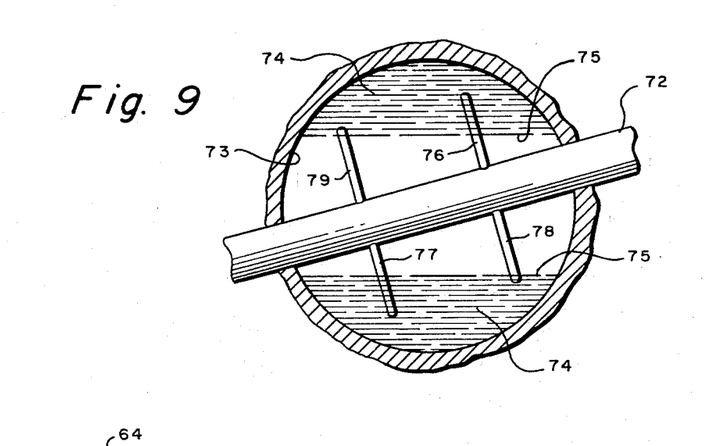
FIGURE 9 is a simplified diagrammatic view of a variable resistance pick-off system.

In FIGURE 9 is illustrated still another embodiment of this invention utilizing mercury or other electrically conductive liquid as the fluid. The mercury 74 is contained in spherical cavity 73 and has a cylindrical surface 75. The gyro-wheel shaft 72 carries a pair of fine wires 76, 77 and another pair 78, 79 perpendicular to itself and arranged as shown in FIGURE 9. In FIGURE 9, the apparatus is shown after the warm-up period and with an angular displacement of the gyro-wheel having occurred. It will be seen that if the fine wires have a known resistance, the axial displacement will produce a differential in the resistances of a circuit comprising wires 76, 77 and a circuit comprising wires 78, 79. This differential will be an index of the amount of angular displacement of the axes. The means and methods for interpreting this signal and the other equipment described in connection with the other embodiments of this invention are equally applicable to this resistance pick-off embodiment. The slight ripples produced by the wires intersecting the mercury will be suppressed by the high radial acceleration forces acting at the mercury surface 75 as has been described above. The wires may be extended to the cavity wall if necessary for structural strength.

The resistance wires are incorporated into a bridge circuit and system as illustrated in FIGURES 4 and 4A. In this embodiment, D.C. voltage may be used, since the A.C. carrier needed in the capacitance pick-off to provide a finite resistance is not necessary with a resistance pick-off.

Figures 11, 12, 12A:
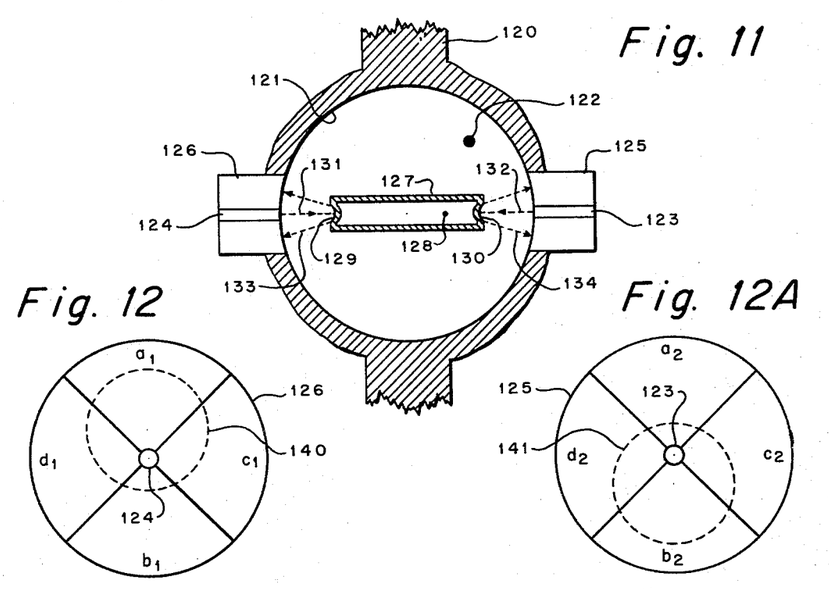
FIGURE 11 is a cross-sectional diagrammatic view of a submerged body, quadrant-photo-cell, pick-off system.
FIGURES 12 and 12A illustrate the light pattern produced when an angular relative displacement of the gyro-wheel and fluid gyro axes occurs in the embodiment shown in FIGURE 11.

In FIGURE 11 is shown in diagrammatic form, another means whereby the axis of the rotating fluid of the inner gyro may be identified so that any difference in alignment between the rotational axes of the gyro-wheel 120 and of the inner gyro 122 may be determined. The spherical cavity 121 contains the inner gyro fluid which may be a suitable liquid as described above or a compressed gas as described above. In the drawing, a gas is illustrated. The pick-off means comprises a submerged body 127 which in its usual form will be a body of revolution, generally an elongated, thin circular cylinder. This submerged body will normally be hollow, containing within it hollow 128. It is seen that the average density of the submerged body and also its compressibility may be easily conformed to any desired standard by choosing the appropriate thickness and material of its solid portion.

In the preferred embodiment of this type of pick-off, the submerged body 127 is constructed to have an average density equal to or slightly less than that of the fluid. That is, the submerged body is neutrally or slightly buoyant with respect to the fluid. The compressibility of the submerged body is also made to equal, as near as may be, the compressibility of the fluid 122. This is accomplished by making the cylinder thin enough to have the same or a slightly larger compressibility than the surrounding compressed gas. The average density is kept at the desired value by compressing a light gas, such as hydrogen or helium, inside the cylinder. The gas in the cylinder may be mixed so as to provide maximum compensation for temperature, density and compressibility.

At each end of submerged body 127, a small concave mirror of spherical configuration is provided. Mirrors 129 and 130 are illustrated in FIGURE 11. At opposite sides of the cavity 121, and located coincident with its general rotational axis, are light sources 123 and 124. Light source 123 projects a beam of incident light 132 toward mirror 130. Light source 124 projects a beam of incident light 131 towards mirror 129. Arranged around the light sources are photo-cell quadrants 125 and 126, respectively, as shown. These photo-cell quadrants are described in detail below. Mirror 130 reflects back a circular light beam 134 and mirror 129 reflects back circular light beam 133 toward their respective opposed photocell quadrants 125 and 126 respectively.

The submerged body 127 will tend to remain accurately aligned with the general rotational axis of inner gyro 122, so that if the rotational axis of gyro wheel 120 is displaced because of an external force with respect to the rotational axis of the inner gyro 122, it will be similarly displaced with respect to the longitudinal axis of submerged body 127.

In the submerged body embodiment, illustrated in FIGURE 11, the submerged body may be slightly buoyant with respect to the fluid. Viscosity coupling forces will tend to make the submerged body 127 rotate on its own longitudinal axis with the rotating fluid. A negative centrifugal force acts on the body tending to keep it aligned along the rotational axis of the fluid. The positive centrifugal force acting on the body less the larger negative static force is here called "negative centrifugal force." If the longitudinal axis of the submerged body tends to be displaced but parallel to the fluid rotational axis, the negative centrifugal force acts to move the displaced submerged body axis back to coincide with the fluid rotational axis in a spiral. The much weaker viscosity coupling force tends to move the submerged body axis cylindrically around the fluid axis. Therefore, it is seen that the prevailing forces tend to prevent parallel displacement of the submerged body axis from the fluid axis. If the submerged body longitudinal axis becomes angularly displaced to the fluid axis, the negative centrifugal force creates a torque which precesses the body so as to rotate the submerged body axis conically (with a fixed opening angle) around the fluid axis. The viscosity coupling creates a much weaker torque which precesses the body so as to turn its axis toward the fluid axis. Thus, the submerged body tends to resist an angular displacement also, tending to "spiral in" in a tight spiral.

If the compressibility of the fluid be greater than that of the submerged body, the submerged body would tend to increase buoyancy when its axis moves away from that of the fluid axis, so that the resulting negative centrifugal force would tend to return the axis of the submerged body to coincidence with the fluid axis. Therefore, a slightly greater relative compressibility of the submerged body tends to increase stability.

If the submerged body is not neutrally buoyant, external accelerations would tend to displace the submerged body with respect to the fluid. Specifically, an external acceleration acting along the rotational axis would tend to move the submerged body with respect to the fluid along the rotational axis.

The preferred form of the submerged body embodiment illustrated in FIGURE 11 comprises a submerged body 127 which is neutrally or slightly buoyant with respect to the fluid 122. Its compressibility is slightly greater than of the fluid. Thus, externally acting accelerations will have a very small effect on the position of the body with respect to the fluid. Preferably, means should be provided to prevent any drift of the submerged body along the rotational axis of the fluid which might occur. Various physical centering means are available. Very fine and delicate "fingers" may be used to center the submerged body along the axis. Another method and means of centering would comprise manufacturing the submerged body from a non-magnetic material and providing a small ferro-magnetic body (such as an iron ball, for example) in the center the submerged body. Photo-electric cells would be provided to pick up and indicate any drift of the submerged body along the fluid axis of rotation. Electro-magnets aligned with the axis of rotation would then be activated by the photo-electric cells to move the submerged body back toward its proper central position. A slight displacement of the submerged body along the fluid gyro axis does not introduce any error in the signal output of the pick-off system.

An incident light beam 131 will be reflected back in a divergent circular light beam 133 which will be centered around and symmetrical to the incident light beam 131 when there is no axial misalignment between submerged body 127 and gyro wheel 120. This condition is illustrated in FIGURE 11. If an angular displacement occurs, the reflected light beam 133 will no longer be reflected back centered around the incident light beam 131. The provision of a spherical concave mirror 129 results in a large magnification of the reflected light angle, so that the sensitivity of the pick-off system to slight angular displacements is greatly increased.

It will be appreciated that when an angular displacement occurs, the reflected light beam at both ends of submerged body 127 will be affected. It is likewise apparent that if submerged body 127 should be displaced in a parallel condition from the rotational axis of inner gyro 122, there will also be an effect on the reflected circular light beams 133 and 134. The effect of parallel displacement and angular displacement is considered below with reference to FIGURES 12 and 12A and FIGURES 13 and 13A.

FIGURE 12 illustrates in simplified form a view of photo-cell quadrant 126 from the interior of cavity 121 and along the general rotational axis. Four photo-cells $a-1$, $b-1$, $c-1$, and $d-1$ are arranged as shown around light source 124, each photo-cell covering 90° of arc around the light source. FIGURE 12A shows the photo-cell arrangement around light source 123, comprising the four photo-cells $a-2$, $b-2$, $c-2$, and $d-2$ arranged exactly as described with reference to photo-cell quadrant 126.

FIGURES 12 and 12A illustrate a condition in which the gyro wheel and the submerged body have a relative angular displacement. In FIGURE 12, the reflected light beam is shown falling on photo-cell quadrant 126 in a circular pattern 140. In FIGURE 12A the reflected light beam from the other end of the submerged body is shown falling on photo-cell quadrant 125 in a circular pattern 141. Since the submerged body is angularly displaced with respect to the rotational axis of the gyro wheel (which, it will be seen, is coincident with a line between light sources 123 and 124) the light pattern 140 is not centered around the light source 124.

In FIGURE 12, the reflected light pattern 140 is shown displaced upwardly, so that more light falls in quadrant $a-1$ than in $b-1$. It necessarily follows that the reflected light from the other end, as illustrated in FIGURE 12A, will be displaced in the same magnitude but in a diametrically opposed direction to the displacement of the light as shown in FIGURE 12. Thus, reflected light pattern 141 falls more in quadrant $b-2$ than in $a-2$.

Figures 13, 13A, 14:
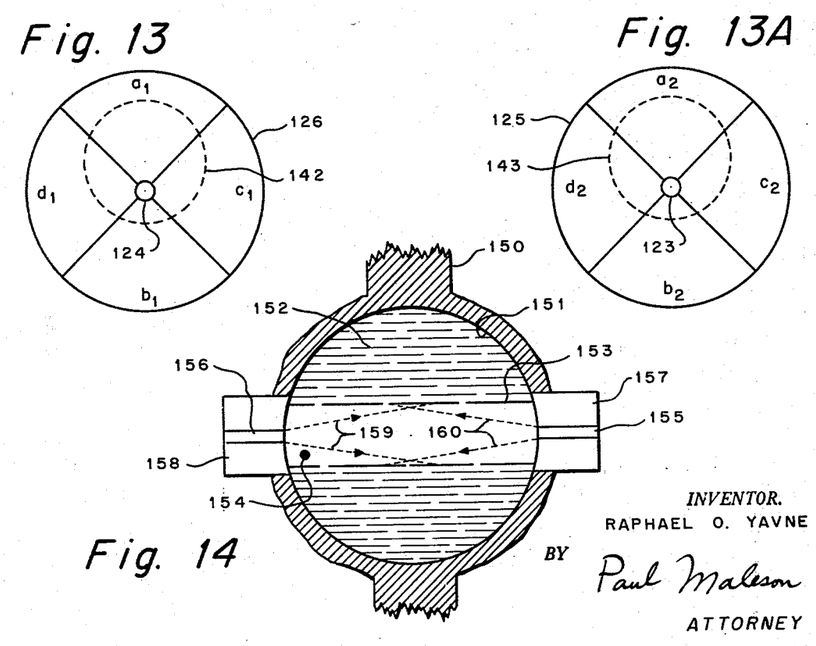
FIGURES 13 and 13A illustrate the light pattern produced when a parallel relative displacement of the gyro-wheel and fluid gyro axes occurs in the embodiment shown in FIGURE 11.
FIGURE 14 shows in simplified diagrammatic form an embodiment using a photo-cell quadrant pick-off system with an opaque liquid.

FIGURES 13 and 13A illustrate photo-cell quadrants 125 and 126 in the same manner as they are illustrated in FIGURES 12 and 12A. In FIGURES 13 and 13A, a condition is illustrated wherein the submerged body 127 has been displaced from the rotational axis of the fluid gyro 122 in a parallel relation to that axis but without indicating any angular displacement. In FIGURE 13, a reflected light pattern 142 is shown displaced upwards from light source 124 and in FIGURE 13A, the reflected light pattern 143 from the opposite end of the submerged body is shown displaced upwards identically with the displacement shown in FIGURE 13.

In FIGURE 14 is shown in diagrammatic form an embodiment of the invention wherein the fluid 152 contained within cavity 151 is a liquid which is substantially opaque or at least relatively highly opaque to the radiations, normally ordinary light, from light sources 155 and 156. A satisfactory liquid for use in this embodiment is mercury. Light source 155 is surrounded by photo-cell quadrant 157. Light source 156 on the other side of cavity 151, is surrounded by photo-cell quadrant 158. The light sources and photo-cell quadrants are the same as those described in connection with the embodiment of FIGURE 11 and as illustrated in FIGURES 12, 12A, 13 and 13A. The only difference in the light sources 155 and 156 from the light sources described in connection with the embodiment in FIGURE 11 is that in the embodiment illustrated in FIGURE 14, the light beams 159 and 160 diverge from light sources 156 and 155 respectively. The degree of divergence of these light beams may be obtained in any commonly known manner, such as, for example, by use of appropriate lenses or apertures.

In FIGURE 14, the gyro-wheel 150 is shown in a condition after it has rotated so as to bring the mercury 152 up to its operative speed. As has been described previously, this condition results in the formation of a cylinder 154, free of liquid mercury, whose surface 153 is parallel to the general axis of rotation of the inner or fluid gyro 152. It will be easily seen from FIGURE 14 that since the light beams 159 and 160 diverge from their sources so as to intersect mercury surface 153, the photo-cell quadrants 157 and 158 will be illuminated wherever the mercury 152 does not contact them and only where they are not contacted by the mercury. The surface 153 of the mercury may be temporarily slightly deformed from its true cylindrical shape near its lines of intersection with the photo-cell quadrants 156 and 157 because of the greater magnitude of the viscosity coupling effect near the cavity walls. That is, an error drift of the gyro-wheel 150 may affect the liquid near the cavity walls before it is corrected. In this case, the surface 153 may have a slight "bend" at its ends. It can be shown that such a distortion does not cause a spurious signal output from the photo-cell quadrant pick-off, but only results in a slight loss of sensitivity.

Referring again to FIGURES 12, 12A and 13 and 13A, in connection with the embodiment illustrated in FIGURE 14, it is seen that the locations of the light pattern 140, 141, 142 and 143 are dependent upon the location of the mercury surface 153. In each case, the boundaries of the light patterns coincide with the intersection of the mercury surface 153 with the face of the photo-cell quadrants.

The signals produced by the two photo-cell quadrants in the embodiment of either FIGURE 11 or FIGURE 14 are used to servo the gyro-wheel by means and methods similar and analogous in all respects to the means and methods described above in connection with other embodiments of this invention. The signals from the photo-cell quadrants are added so that treated algebraically the two signals may be considered as follows:

(1) $(a_1-b_1)-(a_2-b_2)=(a_1+b_2)-(b_1+a_2)$ (2) $(c_1-d_1)-(c_2-d_2)=(c_1+d_2)-(d_1+c_2)$

It will be seen that when the light patterns are centered on the photo-cell quadrants, as is the case where there is no displacement whatever, no signal is produced.

Where an angular displacement has occurred, as is illustrated in FIGURES 12 and 12A, it will be seen that the signal $(a_1-b_1)-(a_2-b_2)$ will be quite large. This signal will be an index of the amount of angular displacement occurring in a vertical direction as seen in FIGURES 12 and 12A. It is understood of course that a component of the angular displacement occurring horizontally as seen in FIGURES 12 and 12A produce a large signal when the signals are treated algebraically as $(c_1-d_1)-(c_2-d_2)$ If, for any reason, the light patterns indicate a displacement of the axis indicating means from the general inner-gyro axis but parallel to said axis, as is illustrated in FIGURES 13 and 13A, it will be seen that the signal $(a_1-b_1)-(a_2-b_2)$ will be zero, so that no spurious signal will be produced by a parallel displacement. The same thingw ill hold true, of course, for a component of parallel displacement acting in a horizontal direction on FIGURES 13 and 13A. The necessity of considering a possible parallel displacement arises, of course, mainly in connection with the submerged body embodiment shown in FIGURE 11.

In the photo-cell quadrant pick-off system, there are eight sensitive elements, and this is a "four-pair" system as contrasted, for example, to the embodiments illustrated in FIGURES 2 and 6 which are "two-pair" systems. The four-pair system illustrated in FIGURES 12, 12A, 13 and 13A discriminates its signals into azimuth and elevation signals so that no discriminator, as is illustrated in FIGURE 4, need be used. It is only necessary to provide one position reference signal to determine which quadrant photo-cell is at a predetermined position. Means for providing such a reference signal have been described above. The provision of a four-pair system, by eliminating the discriminator, will eliminate any noise that might be produced by this element. Otherwise, the two and four pair systems are equivalent in their results.

It will be appreciated that the various types of pick-off devices, such as capacitance (FIGURE 2) resistance (FIGURE 9), photo-electric (FIGURE 6) or photo-electric (FIGURES 11–14) may all be arranged so as to be one pair, two pair, or four pair systems. For instance, by eliminating plate pair 20, 23 from the capacitance embodiment of FIGURE 2, this pick-off becomes a one pair system.

One, two, and four-pair sensitive element systems can all be made to perform equivalent signal functions. From an electronic point of view, the two-pair system is preferred to the one-pair system. A two-pair system provides twice the signal strength of a one-pair system due to its greater number of sensitive elements. In a bridge (for capacitance or resistance types) or a summing amplifier (for photoelectric types) the effect of the two pairs is to produce a double difference signal with its obviously attendant advantages, where an axial misalignment has occurred and is being detected and measured.

Where the entire gyro system has been subjected to an acceleration normal to the rotational axis of the gyro, the fluid gyro surface transiently loses its circular cylindrical shape. It can be easily shown that this produces a signal of double the gyro-wheel rotational frequency from one pair of elements. This double frequency signal is filtered out by filter 43 (FIGURE 4) and hence does not impair the accuracy of the system. Where a two-pair element system is used, it can be shown that the double frequency is cancelled out in the bridge circuit and hence leaves less spurious signals to be filtered out.

Where there has been an external acceleration of the whole gyro along the rotational axis of the gyro, the fluid gyro surface transiently loses its cylindrical shape and becomes a truncated cone. One pair of sensitive elements then produces a signal with a D.C. bias. This bias is filtered out as described above and hence does not impair the operation of the entire gyro system. If a four-pair system is used, it can be shown that the D.C. bias can be made to cancel out, leaving less spurious signals for the filter to remove.

Thus it is seen that the two-pair system is somewhat more "elegant" in its signal production, but both one and two-pair systems are operative.

The cavity containing the fluid, which is one important aspect of this invention, may be provided in a number of different forms. It may be mechanically or otherwise inconvenient to provide the cavity right at the center of the gyro-wheel. It may, for instance, be necessary or desirable to have part of the gyroscope motor positioned through the gyro-wheel so that it occupies the space indicated in the drawings as being occupied by the cavity. In such a case, the cavity may take the form of a ring or torus around the motor and within the gyro-wheel. Part of the interior surface of the cavity may be given a spherical contour. Where the fluid is a liquid, touching only a spherical surface when at operative speed, and the pick-off elements are located properly adjacent the liquid surface as above described, the cavity will be the full equivalent of a completely spherical cavity.

Likewise, if construction problems prevent the central location of the cavity within the gyro-wheel, it may be displayed along the rotational axis of the wheel so that it is contained within a gyroscope element located to one side of the wheel itself but rotating integrally with the wheel. For example, the cavity and pick-off shown in FIGURE 2 could be located along the same shaft 28 but displaced to the right so that the cavity is no longer centered under the wheel 8.

It is understood that a reference to the "cavity contained within the gyro-wheel" or similar phrase in the claims or elsewhere is intended to include the modifications of the type and location of the cavity described immediately above.

The pick-off systems described in this specification have all been explained and exemplified in connection with gyroscope stabilizing means. It will be seen, however, that the pick-offs serve the general function of determining deviations in the alignment of spaced surfaces, which may be relatively rotating and one of which may be fluid. More generally, these pick-offs have utility in determining the alignment of a surface with respect to a predetermined line. The signal output of these pickoffs has certain advantages over previously known devices.

The scope of this invention is to be determined by the appended claims and is not to be limited only to the specific embodiments described and illustrated herein.

I claim:

1. A self-servoing gyroscope system comprising a gyroscope wheel, means to support said wheel, means to rotate said wheel, a cavity having at least a partly spherical surface and having said surface associated with said gyroscope wheel so as to rotate therewith, a fluid at least partially filling said cavity so as to act as a fluid gyro, pick-off means to identify the rotational axis of said fluid gyro, detect a difference in alignment of the axes of rotation of said gyroscope wheel and said fluid gyro and to provide a signal indicating the magnitude and direction of said difference in alignment, wherein said fluid is an electrically conductive liquid and only partly fills said cavity and said pick-off comprises a capacitance plate located adjacent the surface of said fluid, means to provide an electrical potential across the capacitor formed by said fluid and said plate, and means to interpret a change in the capacitance of said capacitor, torquing means to alter the rotational axis of said gyroscope wheel, means to apply the said signal from said pick-off to the said torquing means whereby said gyroscope wheel is torqued so that it axis tends to remain aligned with said fluid gyro axis.

2. A self-servoing gyroscope system comprising a gyroscope wheel, means to support said wheel, means to rotate said wheel, a cavity having at least a partly spherical surface and having said surface associated with said gyroscope wheel so as to rotate therewith, a fluid at least partially filling said cavity so as to act as a fluid gyro, pick-off means to identify the rotational axis of said fluid gyro, detect a difference in alignment of the axes of rotation of said gyroscope wheel and said fluid gyro and to provide a signal indicating the magnitude and direction of said difference in alignment, wherein said fluid is an electrically conductive liquid and only partly fills said cavity and said pick-off comprises an electrical resistance means at least partially normally in contact with said fluid, means to provide an electrical current through said electrical resistance means and said fluid to form a circuit, and means to interpret a change in the resistance of said circuit, torquing means to alter the rotational axis of said gyroscope wheel, means to apply the said signal from said pick-off to the said torquing means whereby said gyroscope wheel is torqued so that its axis tends to remain aligned with said fluid gyro axis.

3. A self-servoing gyroscope system comprising a gyroscope wheel, means to support said wheel, means to rotate said wheel, a cavity having at least a partly spherical surface and having said surface associated with said gyroscope wheel so as to rotate therewith, a fluid at least partially filling said cavity so as to act as a fluid gyro, pick-off means to identify the rotational axis of said fluid gyro, detect a difference in alignment of the axes of rotation of said gyroscope wheel and said fluid gyro and to provide a signal indicating the magnitude and direction of said difference in alignment, wherein said pick-off means comprises a light source within said cavity and a photoelectric cell within said cavity and positioned to receive light originating from said light source and means to interpret a change in the amount of light impinging upon said photoelectric cell, torquing means to alter the rotational axis of said gyroscope wheel, means to apply the said signal from said pick-off to the said torquing means whereby said gyroscope wheel is torqued so that its axis tends to remain aligned with said fluid gyro axis.

4. A system as defined in claim 3 wherein said fluid comprises a liquid only partially filling said cavity and a compressed gas having a greater density than said liquid filling the remainder of said cavity.

5. A system as defined in claim 3 wherein said fluid comprises a liquid only partially filling said cavity and said fluid is opaque to the light originating from said light source.

6. A self-servoing gyroscope system comprising a scope wheel, means to support said wheel, means to rotate said wheel, a cavity having at least a partly spherical surface and having said surface associated with said gyroscope wheel so as to rotate therewith, a fluid at least partially filling said cavity so as to act as a fluid gyro, pick-off means to identify the rotational axis of said fluid gyro, detect a difference in alignment of the axes of rotation of said gyroscope wheel and said fluid gyro and to provide a signal indicating the magnitude and direction of said difference in alignment, wherein said fluid comprises a gas and said pick-off comprises a submerged body suspended in said gas, a light source within said cavity, a photocell within said cavity, a reflective surface on said submerged body positioned to reflect light from said light source to said photocell, and means to interpret a change in the amount of light impinging upon said photocell, torquing means to alter the rotational axis of said gyroscope wheel, means to apply the said signal from said pick-off to the said torquing means whereby said gyroscope wheel is torqued so that its axis tends to remain aligned with said fluid gyro axis.

7. A pick-off system for detecting a change in the alignment of a surface with respect to a relatively rotating predetermined axis comprising four pairs of sensitive elements, each of which pair provides a signal, means to algebraically add said signals, means to provide a signal indicating the relative rotational position along the arc of rotation of a predetermined pair of said sensitive elements and means to interpret said signals whereby complete information regarding the magnitude and direction of said change in alignment is provided.

References Cited by the Examiner

UNITED STATES PATENTS

| | | | |
|---|---|---|---|
| 1,890,831 | 12/1932 | Smyth | 74—5 |
| 3,078,729 | 2/1963 | Wright | 74—5.6 |

FRED C. MATTERN, Jr., *Primary Examiner.*

BROUGHTON G. DURHAM, *Examiner.*

J. PUFFER, *Assistant Examiner.*